United States Patent
Fulmer

[19]

[11] Patent Number: 6,096,202
[45] Date of Patent: Aug. 1, 2000

[54] METHOD AND APPARATUS FOR OPTIMIZING ELECTROLYTIC PRODUCTION OF A HALOGEN IN A WATER TREATMENT SYSTEM

[75] Inventor: Paul F. Fulmer, Plantation, Fla.

[73] Assignee: Autopilot Systems, Inc., Ft. Lauderdale, Fla.

[21] Appl. No.: 09/356,170

[22] Filed: Jul. 16, 1999

Related U.S. Application Data

[62] Division of application No. 09/162,692, Sep. 28, 1998, Pat. No. 5,993,669.

[51] Int. Cl.[7] .................................................. C02F 1/76
[52] U.S. Cl. .......................... 210/167; 210/87; 210/136; 210/192; 210/416.1; 205/618
[58] Field of Search ..................................... 210/167, 169, 210/192, 198.1, 87, 103, 136, 137, 416.1, 416.2; 205/556, 618

[56] References Cited

U.S. PATENT DOCUMENTS

| | | | |
|---|---|---|---|
| 2,873,236 | 5/1959 | Ferris | 205/501 |
| 4,100,052 | 7/1978 | Stillman | 204/268 |
| 4,250,126 | 2/1981 | Yates | 210/169 |
| 4,472,256 | 9/1984 | Hilbig | 204/266 |
| 4,584,106 | 4/1986 | Held | 210/754 |
| 4,693,806 | 9/1987 | Tucker | 204/252 |
| 5,037,519 | 8/1991 | Wiscombe | 204/237 |

Primary Examiner—David A. Simmons
Assistant Examiner—Betsey J. Morrison
Attorney, Agent, or Firm—Clifford A. Poff

[57] ABSTRACT

Method and apparatus for optimizing the electrolytic production of a halogen in a water treatment system having a halogen salt dissolved therein. The flow rate to the electrolytic cell is maintained below a predetermined maximum beyond which the remaining flow is diverted from the cell. The flow going to the cell is monitored for flow rate, water temperature and conductivity and the operation of the electrolytic cell is adjusted in response.

21 Claims, 4 Drawing Sheets

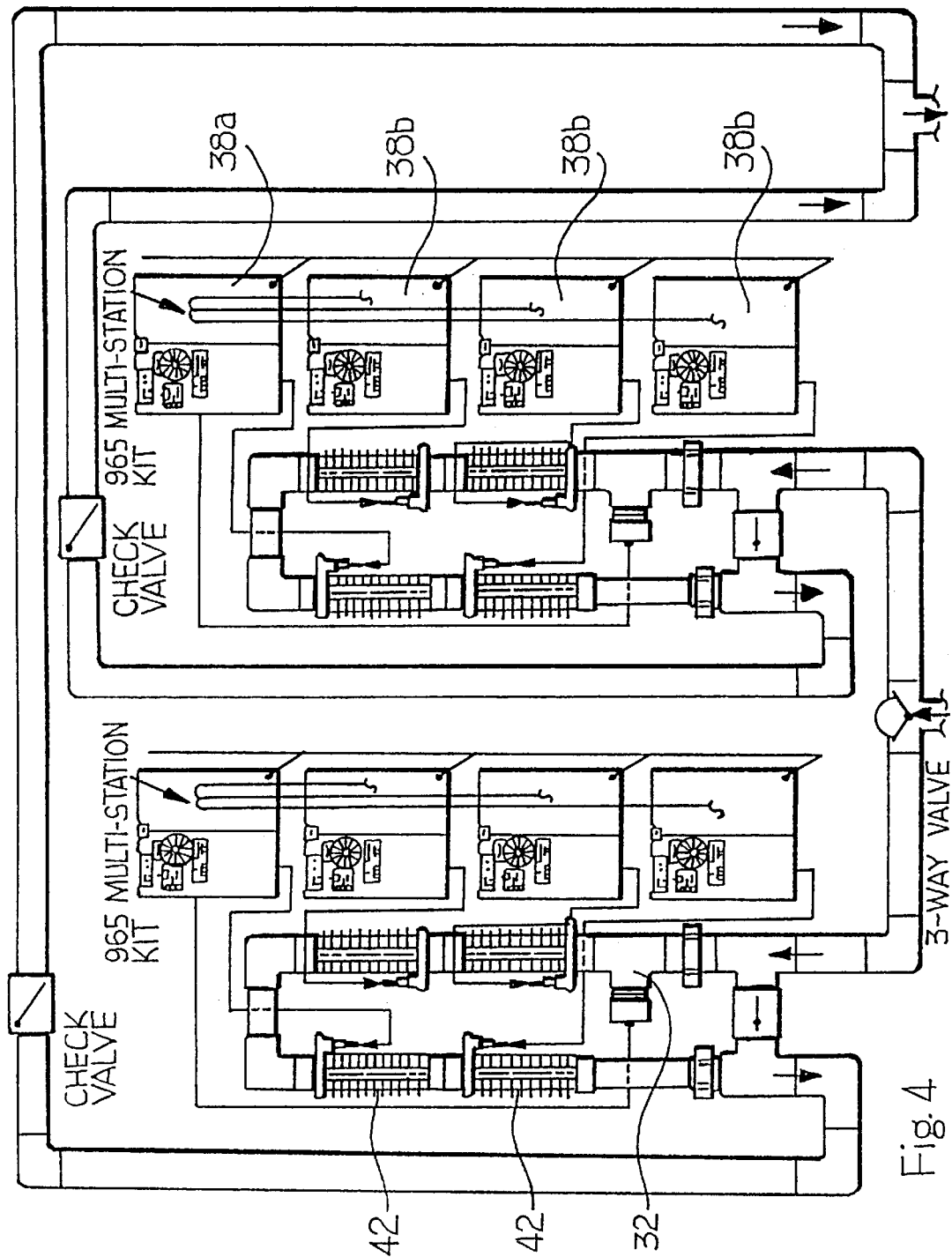

METHOD AND APPARATUS FOR OPTIMIZING ELECTROLYTIC PRODUCTION OF A HALOGEN IN A WATER TREATMENT SYSTEM

This application is a division of application Ser. No. 09/162,692, filed Sep. 28, 1998, now U.S. Pat. No. 5,993,669, issued Nov. 30, 1999.

BACKGROUND OF THE INVENTION

1. Field of the Invention

The present invention relates generally to the electrolytic generation of a halogen, such as chlorine or bromine, for treating algae and bacteria within a water source, such as a swimming pool. More particularly, the present invention relates to an improved system of controlling the production of halogen through control of flow rate to the electrolytic cell and through control over the operation of the electrolytic cell in response to measured parameters in a flow stream to the cell.

2. Description of the Prior Art

The use of halogens, particularly chlorine, to treat water systems such as swimming pools for algae and bacteria has been well known. A common procedure involving the manual introduction of chemicals into the swimming pool, although seemingly simple, has associated problems involving labor and safety issues. This method requires that the water be tested frequently to determine when the chemicals need to be added or if the amount being used is proper. The manual introduction of the chemicals also means that a certain amount of time is required before sufficient dispersion will take place, which results in areas of higher concentrations of chemicals in certain portions of the pool and discomfort for swimmers entering these areas. These methods also require the transportation, storage and handling of often dangerous materials presenting issues of safety and liability for proper care.

Other techniques involve the electrolysis of a brine solution to generate a gaseous form of halogen, such as chlorine gas, which is then collected at the top of a chamber for introduction into the pool water system as disclosed in U.S. Pat. No. 4,693,806 to Tucker and U.S. Pat. No. 5,037,519 to Wiscombe. While these techniques may have reduced the amount of labor involved by eliminating the manual addition of chemicals into the pool and the frequent testing of the water to determine the proper application, concerns over safety remain. These methods require the use of a relatively complicated structure involving a barrier between the anode and cathode sides of the device in order to contain the brine, and to separate the gases which are produced, chlorine and hydrogen in the case of a chlorinator. A safety issue concerns the building up of excess gases in such a device, hydrogen being a highly explosive gas and chlorine gas being poisonous. The use of these systems therefore requires extra care to prevent release or explosion of such gases. These systems are also generally not without labor requirements. The use of the brine solution generally requires that the brine must periodically be replenished as it is depleted. Furthermore, water must be periodically added to maintain the brine in solution.

A further series of techniques involves the electrolytic generation of a halogen, such as chlorine or bromine, by flowing at least a portion of circulating pool water to which a relatively small amount of halogen salt has been added, through the cell to convert the halogen salt into halogen directly in the flow stream. In a chlorinator, for example, dissolved sodium chloride is converted into sodium hypochlorite, as is disclosed in U.S. Pat. No. 4,100,052 to Stillman. Stillman discloses a system which includes a controller for the electrolytic cell, the controller also being connected to the main circulating pump for the pool system. The control system of Stillman is built on a timing system wherein the pump has a cycle of operation and the cell has a shorter cycle contained within the cycle of the pump. An example given is a 12 hour on, 12 hour off cycle for the pump and a 12 minute on, 3 minute off cycle for the cell within the 12 hour on time of the pump.

The control systems of the prior art leave room for improvement in obtaining optimum halogen production for a given cell in a given system. A system that merely controls on/off time of the cell, for example, is not responsive to fluctuations in the flow rate which the circulating pump is presenting to the production cell. These fluctuations in flow rate could result, for example, from obstructions trapped in the filter of the system. Further, it is known in the art, that the production of halogen from an aqueous solution containing a dissolved halogen salt will vary depending on the temperature of the solution as well as the concentration of the halogen salt in the solution.

Therefore, it is an object of the present invention to provide a control system for halogen production in which the flow rate to an electrolytic cell is controlled and in which the operation of the cell is controlled in response to measured parameters including flow rate, water temperature and conductivity.

SUMMARY OF THE INVENTION

According to the present invention there is provided a method and apparatus in a water treatment system for optimizing the production of a halogen used for treating carbon compounds including algae and bacteria. The halogen is produced directly in a portion of the circulating flow stream which has dissolved within it a halogen salt by electrolysis in a production cell. A spring check valve is used to control the flow rate to the production cell to a predetermined maximum, the remainder being diverted from the cell. To further optimize production, the flow stream to the cell is monitored for parameters including flow rate, water temperature and conductivity and the operation of the electrolytic cell is adjusted accordingly in response to the measured parameters.

BRIEF DESCRIPTION OF THE DRAWINGS

FIG. 4 is a layout showing multiple cell manifolds connected in parallel.

DETAILED DESCRIPTION OF THE PREFERRED EMBODIMENTS

Figure 1:
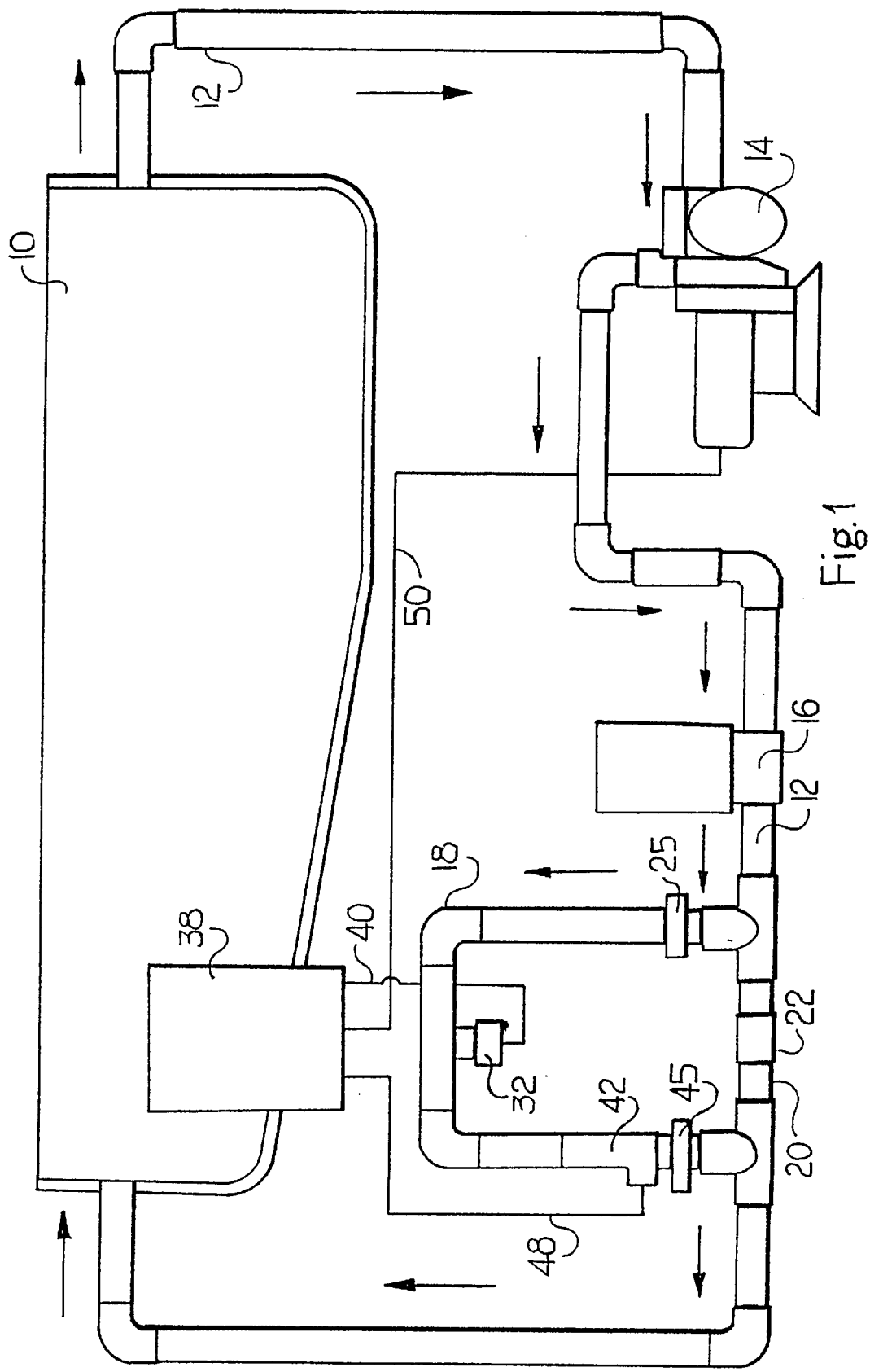
FIG. 1 is a layout showing a typical swimming pool treatment system utilizing the present invention.

Referring to FIG. 1, a schematic of a water treatment system using the present invention is shown. The water source 10, a swimming pool in the case of the embodiment shown, has a relatively small amount of sodium chloride added. It has been found, for example, that a single addition of approximately 400 pounds of sodium chloride to a pool containing approximately 20,000 gallons of water, will serve as the source for the production of chlorine for an entire season because the chlorine is reconverted to sodium chloride in the water treatment cycle, as will be discussed below. As an option, the same system can be used to convert a salt of a different halogen, such as sodium bromide, into bromine which will be used to treat the water source. The salted water is circulated via pipeline 12 by pump 14. The water is then passed through filter 16 to remove debris which may be present in the system. Pump 14 and filter 16 represent typical pool equipment commonly found in swimming pool systems. It should be noted that the features of the present invention would be applicable to larger scale systems using appropriately sized components. Downstream of the filter, the piping system divides into piping sections 18 and 20. Contained within piping section 20 is a spring check valve 22 which serves to direct the pumped fluid into piping section 18 for up to a predetermined maximum flow rate of the pumped water and salt. After the predetermined rate of flow is reached, the spring check valve serves to divert that portion of the flow which exceeds the maximum rate desired in piping section 18, which for the present embodiment is 20 gallons per minute, through piping section 20. This arrangement allows for optimizing the production of chlorine by providing for the ideal amount of flow into piping section 18 regardless of fluctuation in the flow rate existing in piping section 12. Such fluctuations in flow rate could result, for example, from variation in the output of pump 14, or variations in the amount of flow through the filter 16 caused by trapped debris. Contained within piping section 18 is sensor 32 for checking the flow of salted water for parameters including flow rate, water temperature and conductivity, the conductivity measurement varying primarily in response to changes in the salt content of the flow stream. Sensor 32 communicates with a controller unit 38 via line 40. Downstream of sensor 32 and within piping section 18 is the production cell 42 which electrolytically converts the sodium chloride contained within the water into chlorine, in the form of sodium hypochlorite, according to the following equation.

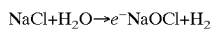

Electrolytic cells, such as cell 42 incorporated in the present invention, are available commercially as separate components by Autopilot Systems, Inc., of Fort Lauderdale, Fla., as Lectrantor® Models SRT-200-360, 600 or 840.

Although the pool system contains the above mentioned filter 16, the manifold also includes an in-line strainer 21 for protecting the cell 42 from debris that might bypass the main filter of the system. The in-line strainer 21 (FIG. 2) is most preferably located in a convenient location, such as in the region of the connecting union 25 contained in piping section 18, thereby facilitating periodic cleaning of the strainer.

The information regarding flow rate, temperature and conductivity which is monitored by sensor 32 is sent to controller 38 via line 40. This information is then used by the controller to control the operation of cell 42 via line 48. The controller ensures that a predetermined minimum flow rate is reached before powering the cell in order to protect the cell. The controller also monitors the flow rate during the operation of the cell, and will power down the cell if the flow rate drops below the required minimum. In a similar fashion, the controller will use the information regarding water-temperature to keep the cell from operating if the water temperature is below a predetermined value. Below approximately 57° F., the chemical process involving the conversion of sodium chloride into sodium hypochlorite is suppressed to such an extent that powering of the cell would be ineffective. The controller uses the conductivity measurement to provide an indication in the event there is insufficient salt content present for the efficient production of chlorine by the electrolytic cell.

It is also possible, if pump 14 has multi-speed capabilities, to have controller 38 communicate with pump 14 via line 50 and control the rate of flow generated by pump 14 if sensor 32 monitors insufficient flow rate in piping section 18.

As seen in the figures, the combination which includes sensor 32, controller 38, lines 40 and 48, electrolytic cell 42, spring valve 22, in-line strainer 21, and piping sections 18 and 20 forms a unit which may be preassembled for easy installation into an existing or new pool system.

The chlorinated water exiting from cell 42 flows into piping section 48 and is prevented from flowing into piping section 20 by valve 22. The chlorinated water is then recirculated back into the water source 10 where the sodium hypochlorite acts on organic compounds such as algae and bacteria. The action of the sodium hypochlorite on the organic products within the water source reconverts the sodium hypochlorite back into sodium chloride according to the following equation.

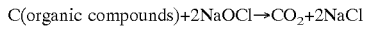

The system thus represents a cycle, wherein the same salt which was added at the beginning of the season is used repeatedly to form sodium hypochlorite.

Figure 2:
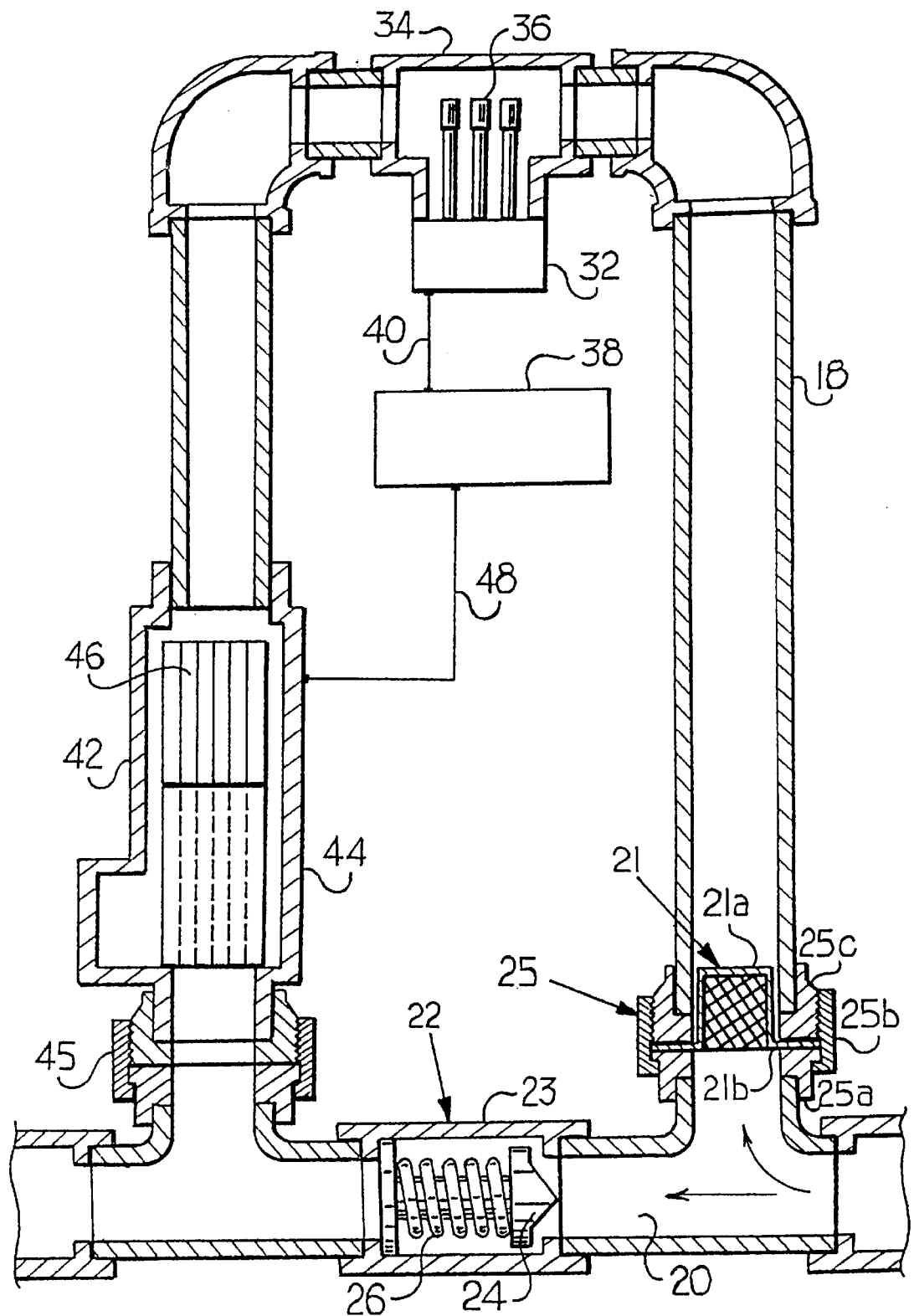
FIG. 2 is a sectional view of the halogen production portion of the system of FIG. 1.

Turning to FIG. 2, the construction of the chlorine production portion of the water treatment system is shown in greater detail. The spring check valve 22 has an outer housing 23 which mates with piping section 20. The valve mechanism includes a piston head portion 24 having an outer periphery which, under flow rates less than the 20 gallon per minute design rate, is seated against a projecting portion of the housing 23, thereby preventing flow past the valve and causing all flow to be diverted into piping section 18. Spring 26 is designed to provide a compressive force sufficient to maintain pressure between the piston head 24 and the projecting portion of housing 23 up to the design flow rate, at which point that portion of flow beyond the design flow rate is allowed to pass into piping section 20.

The in-line strainer 21, as seen in FIG. 2, is housed within a connecting union 25. The strainer 21 includes a basket portion 21A and has an annular disc 21B to which the basket 21A is attached. The annular disc 21B supports the basket in the flow stream through contact of the disc with the ends of sleeves 25A and 25C. A nut member 25B has a flanged portion for interfitting with a flange of sleeve 25A and for placing compression on the union 25 through engagement of threads on nut 25B with external threads on sleeve 25C.

The location of the union 25 directly opposite pipe juncture 45 in parallelly arranged pipe branches of the manifold, as seen in FIG. 2, facilitates access to the in-line strainer 21. By unthreading the nut 25B, the entire manifold assembly may be pivoted about juncture 45, thereby providing access for cleaning or replacement of strainer 21.

Sensor 32 is shown to have a housing 34 which contains probes 36 which extend into the flow area of piping section 18 such that the information regarding flow rate, water temperature and conductivity may be obtained and sent to the controller 38 via line 40.

Electrolytic cell 42 has a housing 44, which should be made of a material that is nonconducting and chemically resistant to the chemicals being processed. Polyethylene would be a suitable choice of material for the housing for the chlorine production of the current embodiment. The cell contains a set of closely spaced parallel plates 46 which serve as the electrodes in the electrolytic process. The plates 46 transmit an ion potential, as is disclosed in U.S. Pat. No. 4,100,052, and are constructed from conductive material such as aluminum or especially titanium.

Figure 3:
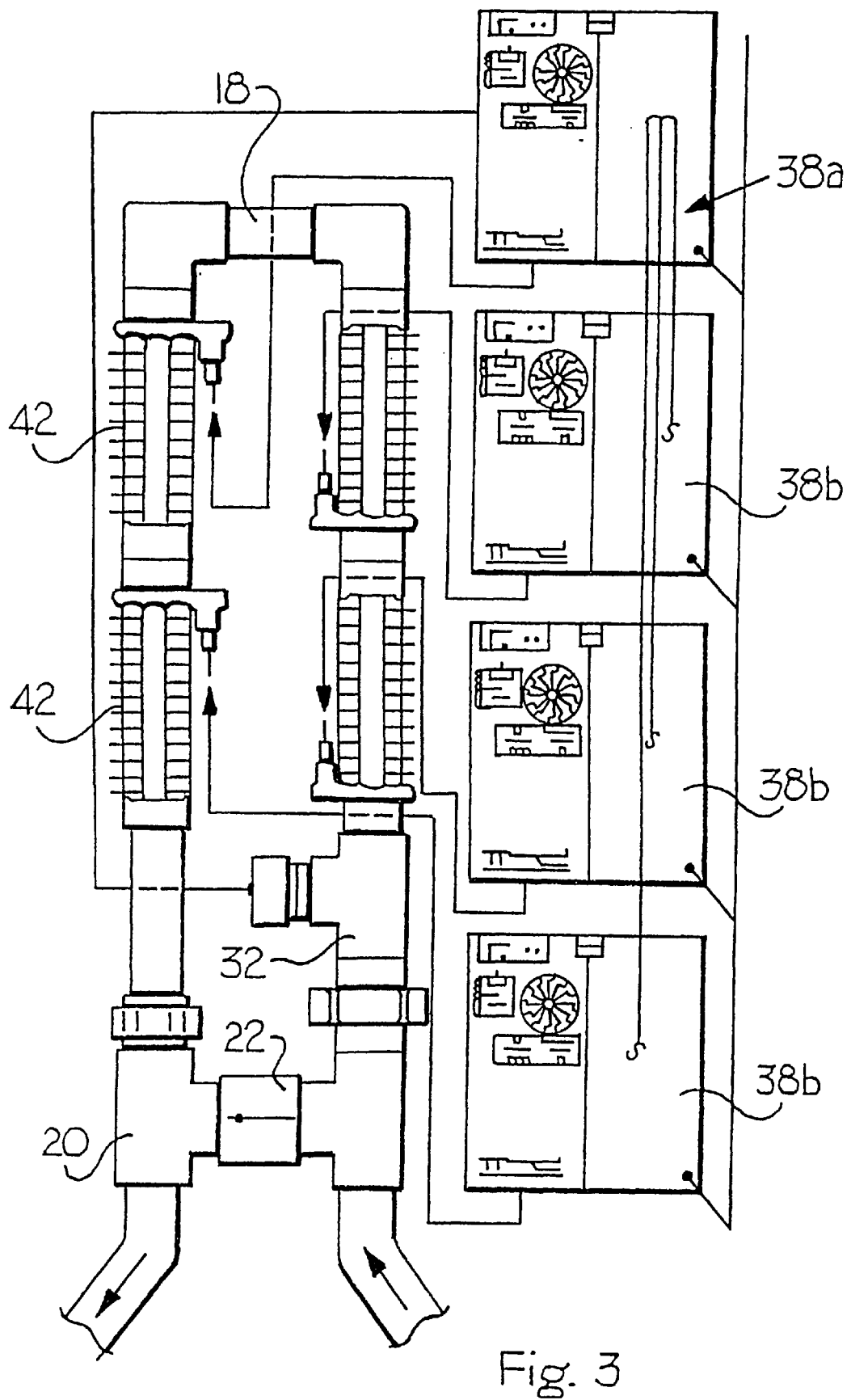
FIG. 3 is a layout showing a multiple cell manifold utilizing the present invention.

Turning to FIGS. 3 and 4, manifold arrangements are shown which involve multiple cells for application in water systems where chlorine demand would exceed single cell capabilities. As opposed to operating a single chlorinator cell under a higher flow rate in order to obtain a desired amount of chlorine production, it is more effective to run multiple cells at a lower, more optimum, flow rate. FIG. 3 shows a manifold system having four cells 42 in series within piping section 18 downstream of sensor 32. As before, the flow rate to the cell is controlled through the use of spring check valve 22 in piping section 20. The multiple cell manifold of FIG. 3 also includes an as shown only in FIG. 2 in-line strainer 21 for protecting the electrolytic cells from debris which may bypass the main filter 16. The control system for the manifold is arranged as follows. The information regarding the flow parameters in piping section 18 is sent to a master controller 38A which is electrically connected to one of the cells 42 for control over the operation of the cell as was previously discussed. Master controller 38A is also electrically connected to slave controllers 38B, each of which is electrically connected to one of the remaining cells 42 for control over that cell. Thus, each of the cells 42 has an associated controller, but only the master controller 38A will establish the operating condition to be applied by all of the controllers.

FIG. 4 displays a dual manifold system, having parallel arranged manifolds each of which is constructed according to the arrangement of FIG. 3. Each of the parallel manifolds contains four cells arranged in series and four associated controllers, one of which functions as the master controller 38A in communication with sensor 32 and the remainder functioning as the slave controllers 38B.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. In a water treatment system, an apparatus including:
   (a) means for producing a halogen from a flow of an aqueous solution having a halogen salt content;
   (b) means operably connected to said halogen production means for controlling the operation of said means for producing; and
   (c) means operably connected to said production means for diverting an amount of aqueous solution from said production means and thereby controlling said flow to said production means to a predetermined maximum rate.

2. An apparatus for treating a water source, the apparatus including:
   a pipeline having a flow characteristic imparting a variable flow rate to circulating water from a water source containing dissolved halogen salt, said pipeline being branched and including a flow rate controller to form a varying flow rate portion and a treatment flow portion having an ideal flow rate predetermined to optimize electrical production of a halogen independent of said varying flow rate portion; and
   a halogen producer coupled for electrically creating a halogen from dissolved halogen salt in the treatment flow portion at said ideal flow rate.

3. The apparatus according to claim 2 wherein said halogen producer includes an electrolytic cell utilizing electric current for producing a halogen.

4. The apparatus according to claim 2 wherein said pipeline includes a pump for circulating water from said water source.

5. The apparatus according to claim 4 wherein said pipeline includes a member for entrapping solid debris in said circulating water.

6. The apparatus according to claim 5 wherein said member comprises a strainer.

7. The apparatus according to claim 5 wherein said member comprises a filter.

8. The apparatus according to claim 2 wherein said flow rate controller includes a valve.

9. The apparatus according to claim 8 wherein said valve is coupled in said varying flow rate portion.

10. The apparatus according to claim 8 wherein said valve is a spring operated check valve.

11. The apparatus according to claim 2 further including a sensor responsive to the flow of circulating water by said pipeline for monitoring at least one of a set of parameters including flow rate, water temperature and conductivity.

12. The apparatus according to claim 11 further including a halogen producer controller responsive to said at least one parameter for preventing operation of said halogen producer when the monitored parameter precludes a production of a halogen at a preselected minimum value.

13. The apparatus according to claim 2 wherein said halogen producer includes a plurality of electrolytic cells spaced along said treatment flow portion for electrically treating the halogen salt at said ideal flow rate.

14. The apparatus according to claim 13 further including a sensor responsive to the flow of circulating water by said pipeline for monitoring at least one of a set of parameters including flow rate, water temperature and conductivity.

15. The apparatus according to claim 14 further including a halogen producer controller responsive to said at least one parameter for preventing operation of said halogen producer when the monitored parameter precludes a production of a halogen at a preselected minimum value.

16. The apparatus according to claim 2 wherein said treatment flow portion is divided into at least two parallel flow portions and wherein each of the parallel flow portions includes at least one electrolytic cell spaced along the treatment flow portion for electrically creating a halogen salt.

17. The apparatus according to claim 16 further including at least one sensor responsive to the flow of circulating water by said pipeline for monitoring at least one of a set of parameters including flow rate, water temperature and conductivity.

18. The apparatus according to claim 17 further including a halogen producer controller responsive to said at least one parameter for preventing operation of said halogen producer when the monitored parameter precludes a production of a halogen at a preselected minimum value.

19. The apparatus according to claim 17 wherein said at least one sensor includes a sensor responsive to the flow of circulating water in each of the parallel flow portions of said treatment flow portion.

20. The apparatus according to claim 17 further including a plurality of halogen producer controllers each of which is responsive to said at least one parameter of one of said sensors for preventing operation of said halogen producer when the monitored parameter precludes a production of a halogen at a preselected minimum value.

21. The apparatus according to claim 2 wherein said halogen producer includes a plurality of halogen producing electrolytic cells along said treatment flow portion for electrically treating the halogen at said ideal flow rate.

* * * * *